H. J. CARMODY.
ALARM FOR ROAD VEHICLES.
APPLICATION FILED FEB. 14, 1918. RENEWED JUNE 29, 1920.
1,367,119.  Patented Feb. 1, 1921.
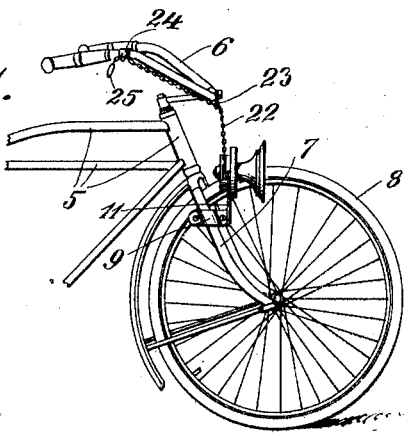
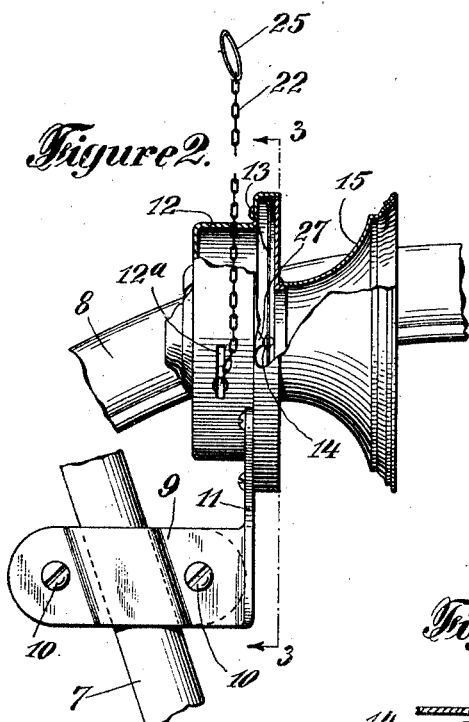
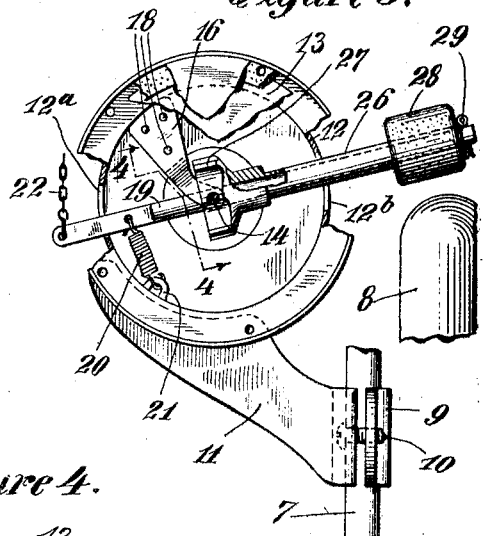
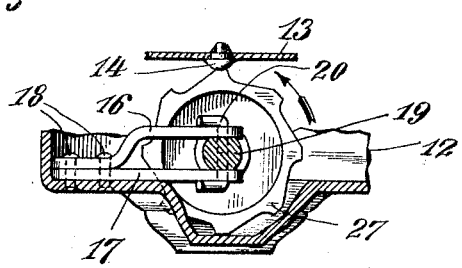
INVENTOR
Harold J. Carmody
BY Walton Harrison
his ATTORNEY

UNITED STATES PATENT OFFICE.

HAROLD J. CARMODY, OF BROOKLYN MANOR, NEW YORK, ASSIGNOR OF ONE-HALF TO JOSEPH A. FAUROT, OF NEW YORK, N. Y.

ALARM FOR ROAD-VEHICLES.

1,367,119. Specification of Letters Patent. Patented Feb. 1, 1921.

Application filed February 14, 1918, Serial No. 217,039. Renewed June 29, 1920. Serial No. 392,773.

*To all whom it may concern:*

Be it known that I, HAROLD J. CARMODY, a citizen of the United States, residing in Brooklyn Manor, in the county of Queens and State of New York, have invented certain new and useful Improvements in Alarms for Road-Vehicles, of which the following is a full, clear, and exact description.

My invention relates to alarms for road vehicles, and more particularly to alarms carried by light road vehicles, such as bicycles and motorcycles, for announcing the approach of such vehicles.

Reference is to be made to the accompanying drawing forming a part of this specification, and in which like letters indicate like parts in all of the figures.

Figure 1 is a fragmentary side elevation of a bicycle carrying my improved alarm.

Fig. 2 is a side view of the alarm mechanism and parts adjacent thereto, and is partly in section and partly in elevation.

Fig. 3 is a section on the line 3—3 of Fig. 2, looking in the direction indicated by the arrows.

Fig. 4 is a section on the line 4—4 of Fig. 3, looking in the direction indicated by the arrows.

The frame of a bicycle is shown at 5, the handle bar at 6, the front fork at 7 and the front tire at 8. A bracket 9 is mounted upon one side of the fork, and held in position by fastening screws 10. This bracket is provided with an upwardly extending arm 11, carrying a casing 12. A diaphragm 13 is mounted within this casing, and is free to vibrate. The diaphragm carries an impact button 14. A flaring horn-like member 15 is carried by the casing, and extends forwardly therefrom, in order to improve and deliver sounds produced by the diaphragm.

Located within the casing 12 are a pair of supporting arms 16, 17, which are secured in position by pins 18 and together constitute a fork, as may be understood from Figs. 3 and 4. Extending through this fork is a pivot pin 20, and supported upon the latter, so as to rock relatively to the casing 12, is a rocking lever 19. This rocking lever extends through slots 12$^a$ and 12$^b$ in the casing.

An actuating chain 22 is connected to one end of the rocking lever, and extends upwardly therefrom through guides 23, 24. The actuating chain is provided with a ring 25, which the operator can grasp at will. The operator can carry this ring on his thumb if he so desires. The operator by pulling upon the chain can rock the lever 19.

Loosely encircling the rocking lever 19, and revoluble relatively thereto, is a sleeve 26, carrying a driving roller 28 secured rigidly upon it, so that rotation of the roller causes the sleeve to turn. A cotter pin 29 extends diametrically through the lever 19, and serves as a limiting stop to prevent end movement of the sleeve 26 in one direction of its length, as may be understood from Fig. 3. The sleeve 26 carries a toothed wheel 27. This toothed wheel has roughly a bell form and is hollow, so that the plates 16 and 17 extend into it. The pivot pin 20 is so located that the general axis of this pivot pin intersects the general longitudinal axis of the rocking lever 19. Moreover, the general axis of the pivot pin coincides with the general axis, or geometrical center, of the diaphragm. By this arrangement the toothed wheel is at all times normal to the diaphragm and to the impact button 14. That is to say, the toothed wheel 27 is always in position to actuate the impact button and cause the diaphragm to sound, no matter what position the rocking lever 19 may occupy, if the sleeve 26 is caused to rotate. A retracting spring 20 is connected to the rocking lever 19, and also to an eye 21, the latter being carried fixedly by the casing. The purpose of the spring 20 is to retract the lever 19 after each movement thereof under control of the chain 22.

The operator, by pulling the chain 22, causes the rocking lever 19 to rock in a clockwise direction according to Fig. 3, so that the driving roller 28 is brought into contact with the tire 8; and upon release or slackening of the chain, the spring 20 causes the lever 19 to rock in a contraclockwise direction according to Fig. 3, so as to assume its normal position indicated in said figure. Each time the lever 19 is so rocked as to force the driving roller 28 into engagement with the tire 8, as above described, the roller 28 is turned, thus communicating a rotary motion to the sleeve 26 and the toothed wheel 27, and the diaphragm is accordingly actuated so that a loud sound is thrown off, as in any other type of mechanical horn. This sound continues so long as the roller 28 remains in engagement with the tire 8—in other words, so long as the operator continues to pull the chain 22.

Since the axis upon which the lever 19 rocks is always coincident with the center of the diaphragm, it necessarily follows that the diaphragm is always normal to the toothed wheel, no matter into what angular position the lever 19 may be shifted by the pull of the chain 22. Such being the case, it matters not whether the tire 8 be large or small, thick or thin, or within reasonable limits whether the normal position of the roller 28 be close to the tire or not, the toothed wheel must always act the same way upon the diaphragm. Thus my device as a whole is well adapted for use upon machines of different kinds, and using tires of different diameters and different thicknesses.

I do not limit myself to the precise mechanism here shown, as variations may be made therefrom without departing from the spirit of my invention as defined by my claims.

I claim—

1. In a device of the character described the combination, with a vibratory diaphragm and a toothed wheel for actuating the same, of a rocking lever carrying said toothed wheel and mounted to rock on an axis extending diametrically through said toothed wheel in order to prevent the rocking movements of said lever from disarranging said wheel relatively to said diaphragm, and mechanism controllable by the rocking movements of said lever for causing said toothed wheel to rotate relatively to said rocking lever.

2. In a device of the character described the combination of a lever mounted to rock upon an axis, a toothed wheel mounted upon said lever and revoluble relatively thereto on an axis intersecting said first-mentioned axis, means controllable at the will of the operator for rocking said lever, mechanism controllable by rocking movements of said lever for the purpose of turning said toothed wheel upon said second mentioned axis, and a vibratory sounding member disposed in operative relation to said toothed wheel and actuated thereby.

3. A device of the character described comprising a vibratory sounding member, a rocking lever disposed adjacent thereto and mounted to rock on an axis, a sleeve encircling said rocking lever and loose relatively thereto, a toothed wheel secured to said sleeve and so located that the axis of said rocking lever extends diametrically through said toothed wheel, a roller secured to said sleeve and movable bodily with said rocking lever as the latter rocks upon said axis, and mechanism controllable by rocking movements of said lever for carrying said roller into and out of engagement with a driving member for said roller.

HAROLD J. CARMODY.